P. M. GILBERT.
BEET PULLING AND TOPPING MACHINE.
APPLICATION FILED FEB. 11, 1909.
937,592.
Patented Oct. 19, 1909.
3 SHEETS—SHEET 3.
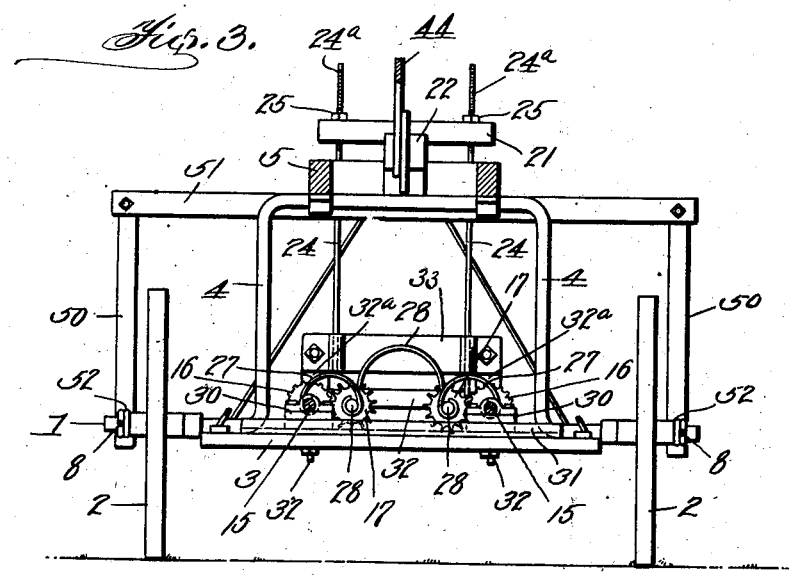
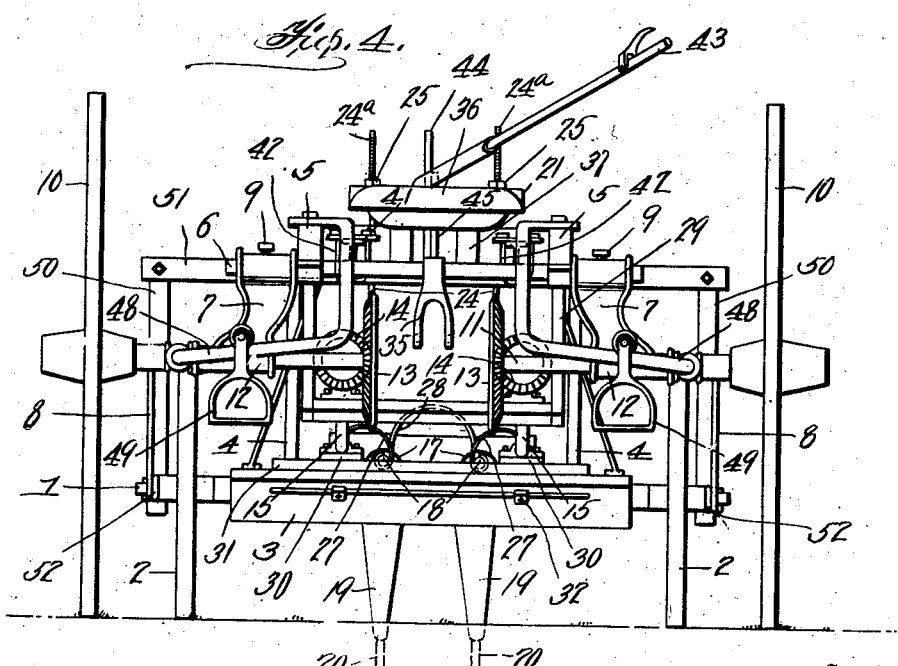

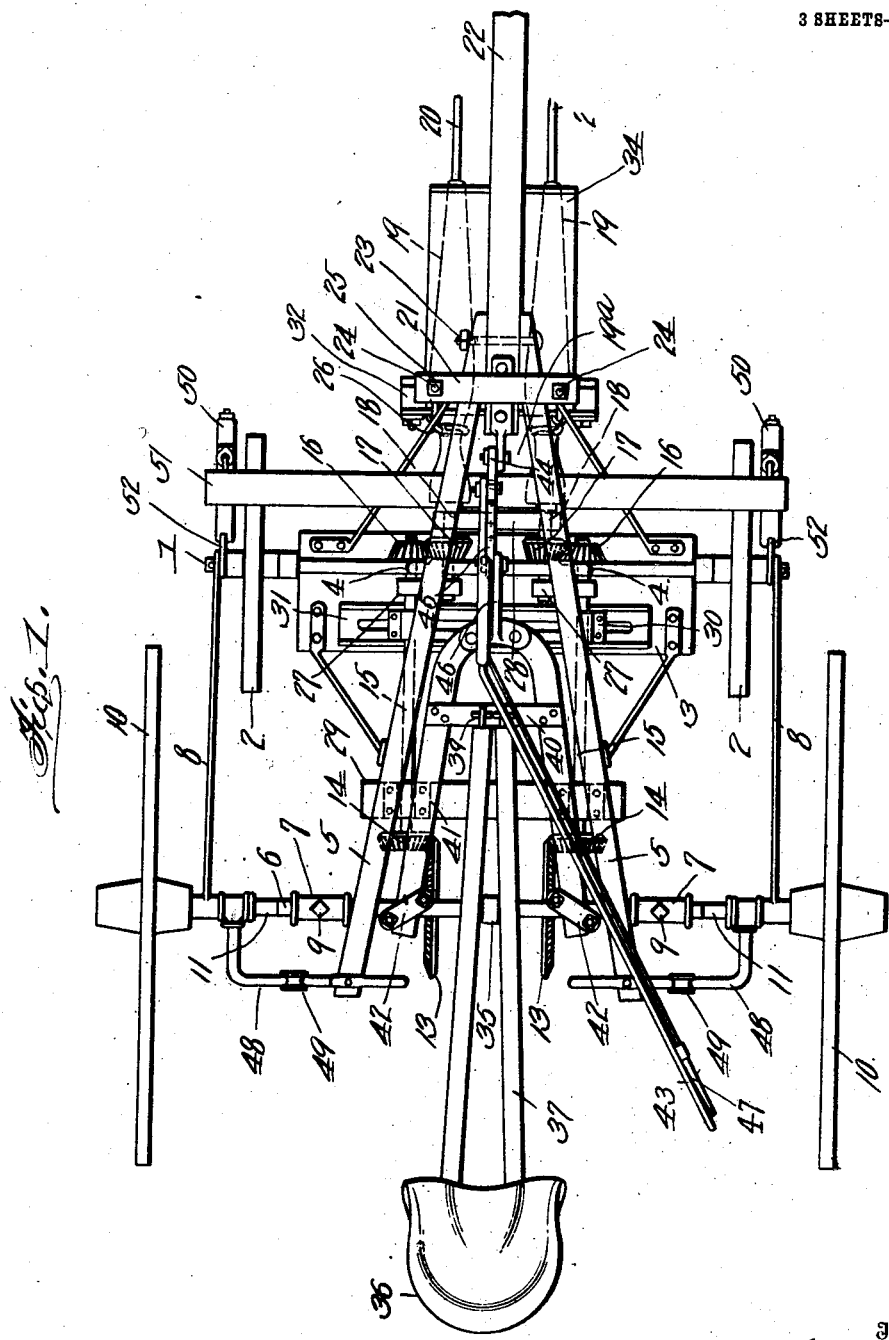

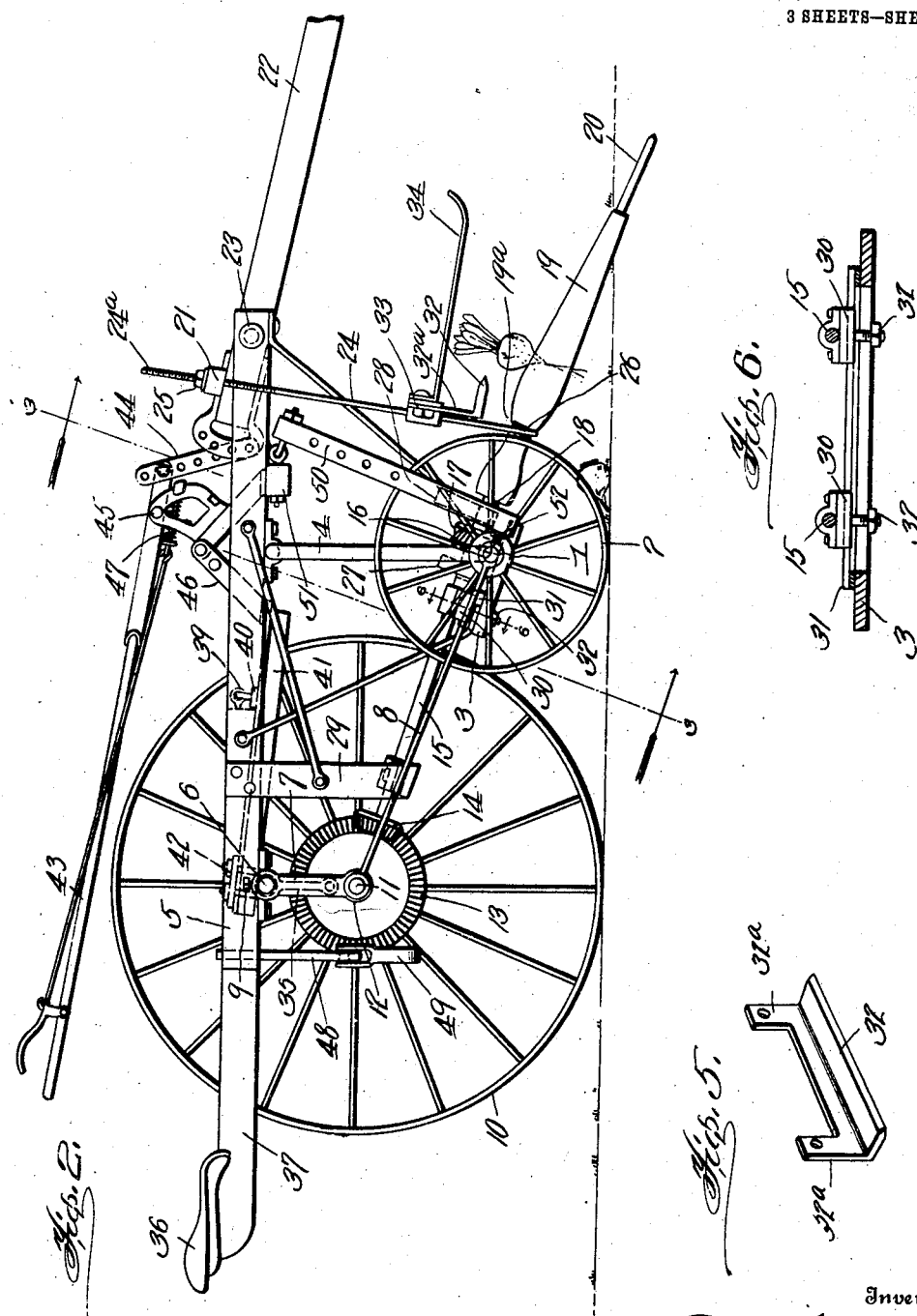

UNITED STATES PATENT OFFICE.

PHILO M. GILBERT, OF HENNESSEY, OKLAHOMA.

BEET PULLING AND TOPPING MACHINE.

937,592.   Specification of Letters Patent.   Patented Oct. 19, 1909.

Application filed February 11, 1909. Serial No. 477,425.

*To all whom it may concern:*

Be it known that I, PHILO M. GILBERT, a citizen of the United States, residing at Hennessey, in the county of Kingfisher and State of Oklahoma, have invented certain new and useful Improvements in Beet Pulling and Topping Machines, of which the following is a specification.

This invention relates to agricultural implements and consists of a novel machine designed for pulling and topping beets.

The invention resides particularly in peculiar features of construction the details and advantages of which will be more clearly pointed out hereinafter.

For a full understanding of the implement comprising this invention, reference is to be had to the following description, and to the accompanying drawings, in which:

Figure 1 is a top plan view of the invention; Fig. 2 is a side elevation, right hand wheel not shown; Fig. 3 is a section taken about on the line 3—3 of Fig. 2; Fig. 4 is a rear elevation; Fig. 5 is a perspective view of the topping blade, and Fig. 6 is a section showing the movable bearings for the puller shafts.

Similar reference characters denote similar parts throughout the following description, and in the accompanying drawings.

Describing the general construction of the invention, the same consists of a frame including a front axle 1 having the small ground wheels 2 mounted thereon, and to which a transverse platform 3 is adjacent, said platform being carried by the lower ends of the sides of an arch 4 the upper portion of which is attached to sills 5 which form a part of the upper framework of the machine. The rear ends of the sills 5 rest upon and are secured to a transverse bar 6 located at the rear end of the machine and connecting two castings 7 together. The castings 7 are attached to the bar 6 by set screws 9, or like fastenings, and permit of adjustment of the distance between rear large ground wheels 10 to accommodate for different widths of beet rows. The wheels 10 are each mounted upon an axle 11 journaled for rotation in a bearing 12 at the lower portion of the adjacent casting 7. Longitudinal draft bars 8 connect the axles 11 with the outer ends of the front axle 1, as shown in Fig. 1. The general framework of the machine is braced by brace rods located at different points, the same not being specifically described.

The inner ends of the axles 11 are spaced apart and keyed thereto are drive gears 13. Each drive gear 13 is in mesh with a bevel gear 14 mounted on the rear end of a drive shaft 15, said shaft 15 being provided at its front end with a small gear 16 in mesh with a similar gear 17. The gear 17 is mounted on the rear end of a shaft 18, the latter supporting a revolving puller 19 at the front end of which is provided a forwardly extending earth auger 20. It is to be understood that the parts 14, 15, 16, 17, 18, 19, and 20, are duplicated so that the axles 11 drive two sets of the above parts which are located in spaced relation. In other words, spaced beet pullers 19 are provided with coöperating earth augers 20, and as the machine is advanced over a field the beets are received between the pullers 19 and are grasped by said pullers, so to speak, as these devices are rotated in opposite directions by means of the shafts and gears just described.

The pullers 19 are supported by a frame consisting of a cross bar 21 arranged above the front ends of the sills 5, and also above the rear end of a tongue or draft device 22 which is pivoted, as shown at 23 between the spaced forward extremities of said sills 5, and to which the draft animals are hitched. Depending from the opposite end portions of the bar 21 are spaced rods 24, the upper ends of which pass through the cross bar 21 and are threaded, as at 24ª, to permit of vertical adjustment thereof by means of nuts 25. The lower ends of the rods 24 are bent upwardly so as to form extensions 26 embracing and receiving the body portions of the pullers, and constituting bearings in which said pullers are adapted to rotate in the operation of the invention. While the pullers 19 are supported between their ends by the rods 24, the rear ends of said pullers, or rather the rear extremities of the shafts carrying the pullers are connected with the front ends of the drive shafts 15 by means of small bow springs 27, said springs coacting to hold the gears 16 and 17 in meshing relation. In front of the small bow springs 27 is located a large bow spring 28 the ends of which connect the shafts of the pullers 19 in such a manner as to permit a certain amount of spreading movement of the pullers in order that they may accommodate for, or operate upon, beets of different sizes. The relative movement of the pullers 19 is also permitted by reason of the mounting of the drive shafts 15 which are supported at their rear ends by a frame 29 depending from the rear portions of the sills 5 and having bearings for said shafts. At their front ends the shafts 15 are mounted in bearings on blocks 30 which are slidably mounted in a U-shaped guide 31 supported on the platform 3. The blocks 30 are connected by bolts 32 to the platform and guide 31, said bolts passing through slots which permit the transverse sliding of the blocks made necessary by the mounting of the pullers 19, and because it is necessary that the invention be adapted for pulling beets of different sizes.

As before premised the invention is designed not only for pulling but also for topping beets, and for the latter purpose it is contemplated to provide a knife 32, said knife being located above the pullers 19 and attached by extensions 32ª to a plate 33 carried by the rods 24. The plate 33 is provided with vertical bearings, receiving the rods 24 in such a manner that said plate may move freely up and down on these rods. The extensions 32ª of the knife may be slotted so as to permit adjustment of the connecting fastenings, to slightly vary the relative positions of the plate 33 and the knife. Projecting forwardly from the plate 33 is a guard 34 the purpose of which is to engage with the tops of the beets as the implement moves over the field, in order to raise and lower the knife 32. The guard 34 automatically adjusts the position of the knife 32 so that the latter will sever the tops of the beets at the proper point, even though said tops may be of different sizes as is usually the case. The pullers 19 comprise tapering bodies adapted to engage the beets as the augers 20 travel through the earth, and when the beets are pulled and topped they are allowed to drop through the space formed by recesses 19ª located at the rear ends of the pullers. A suitable rake attachment, connected with a coupling member 35 shown in Fig. 4 may be used to rake the beets together in piles at intervals in the length of each row. The rake attachment forms no part of the present invention, however.

A seat 36 is provided at the rear end of the machine and is attached to seat bars 37 the front ends of which are connected loosely at 39 with a cross-piece 40 on a floating frame 41. The frame 41 is of U form and its rear ends are coupled to the transverse bar 6 as shown at 42. Connected with the front end of the frame 41 is a hand lever 43 the front end of which is pivotally connected by a plate 44 with the rear end of the tongue 22, see Fig. 2. By means of the lever 43 which is pivoted at 45 to a bracket 46 connected with the front portion of the frame 41, the rear end of the tongue 22 may be raised or lowered as desired. In this manner the frame supporting the pullers 19, and the cross bar 21 of which is above the rear end of the tongue 22, may be raised and lowered in order to cause the augers 20 to move out of or penetrate the earth, respectively. The position of the lever 43 is fixed at a suitable adjustment by means of a suitable latch device 47.

It will be observed that the weight of the operator on the seat 36 counterbalances the tongue 22 in such a manner that operation of the tongue to adjust the pullers 19 so as to throw the same into and out of operation, is greatly facilitated. Guards 48 are secured to the rear ends of the sills 5, and to the outer ends of the axles 11, and these guards support stirrups 49 in which the feet of the operator are placed when he is seated on the machine. At opposite sides of the front portion of the machine are located vertically arranged whiffletrees 50 the upper ends of which are connected with a transverse draft beam 51 attached to the front ends of the sills 5, the lower ends of said whiffletrees being connected by suitable members 52 with the outer ends of the front axle 1. It will be understood that as the machine travels over a field, the pullers 19 being lowered into operative position, they are revolved and in this manner pull the beets out of the ground and permit them to pass rearwardly so as to be topped by the knife 32 in the manner before described.

Having thus described the invention, what is claimed as new, is:

1. In a machine for pulling and topping beets, the combination of a wheeled frame, coöperating pulling devices mounted thereon, a tongue pivotally connected at its rear end portion with the frame, operating means connected with the rear extremity of the tongue for varying its position relative to the frame, and an adjusting frame connected with the pullers and engaged by the tongue for operation thereby when the position of the tongue is changed relative to the frame.

2. In a machine for pulling beets, the combination of a wheeled frame, a tongue connected at its rear end portion to the frame, an operating device whereby the relative positions of the tongue and frame may be changed, an adjusting frame connected at its lower end with the pullers and comprising at its upper end a transverse bar supported on the tongue, whereby when the tongue is moved said adjusting frame will also be moved to change the position of the pullers, and a topping device movably mounted upon the adjusting frame above the pullers.

3. In a machine for pulling and topping beets, the combination of a wheeled frame, a tongue pivotally connected at its rear end to said frame, a lever device connected at the rear extremity of the tongue for effecting pivotal movement thereof relative to the frame, coöperating rotating beet pullers mounted on the frame, an adjusting frame for raising and lowering the said pullers, said adjusting frame comprising side members connected rotatably at the lower ends with the pullers, a transverse bar connected to the upper portion of the side members and resting on the rear end of the tongue, whereby when the position of the tongue is changed relative to the frame, the beet pullers may be also moved into operative or inoperative positions, and a float operated knife mounted upon the sides of the adjusting frame and freely movable vertically relative to the pullers.

4. In a machine for pulling and topping beets, the combination of a support adapted to be advanced over a field, coacting pullers, a frame supporting said pullers, means for operating the pullers, a knife mounted on said frame for floating movement, and means for moving the pullers into and out of operative position.

5. In a machine for pulling and topping beets, the combination of rotary pullers, a supporting frame therefor, an adjusting frame connected with said pullers, draft means connected with the supporting frame, means for adjusting the draft device and simultaneously adjusting the adjusting frame, and a knife mounted on the adjusting frame for floating movement above the pullers.

6. In a machine for pulling and topping beets, the combination of a wheeled supporting frame, draft means therefor, pulling devices mounted thereon, means for connecting said pulling devices with the supporting frame, and means for simultaneously adjusting the draft device and the means connected with the pulling devices, whereby to throw the latter into and out of operative position.

7. In a machine for pulling and topping beets, the combination of a wheeled frame, pulling devices mounted thereon, means for operating said pulling devices, a knife arranged above the pulling devices, a guard connected with the knife to automatically adjust the position thereof, as the pulling devices advance, a depending frame connected with the pulling devices, a tongue pivotally connected with the wheeled frame and adapted to engage the depending frame, means for adjusting the tongue and simultaneously adjusting the position of the depending frame, a seat connected with the tongue, and means permitting of relative movement of the pulling devices toward and from one another.

8. In a machine for pulling and topping beets, the combination of a wheeled frame, driving shafts mounted thereon, puller shafts, pulling devices mounted on the puller shafts, gearing connecting the drive shafts and pulling shafts together, spring means connecting the drive shafts to the puller shafts adjacent to said gearing, and spring means connecting the puller shafts together to permit of relative movement of the pulling devices toward and from one another.

In testimony whereof I affix my signature in presence of two witnesses.

PHILO M. GILBERT.

Witnesses:
J. L. HINES,
H. H. RHODES.